INVENTORS
David F. Thomas
Robert A. Hill
BY
ATTORNEY

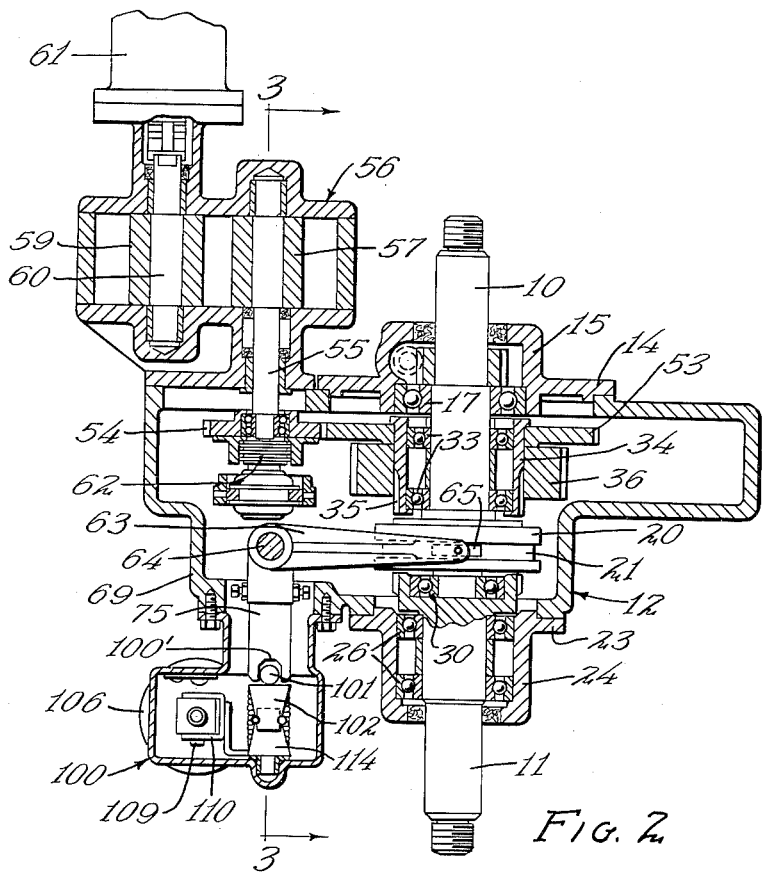
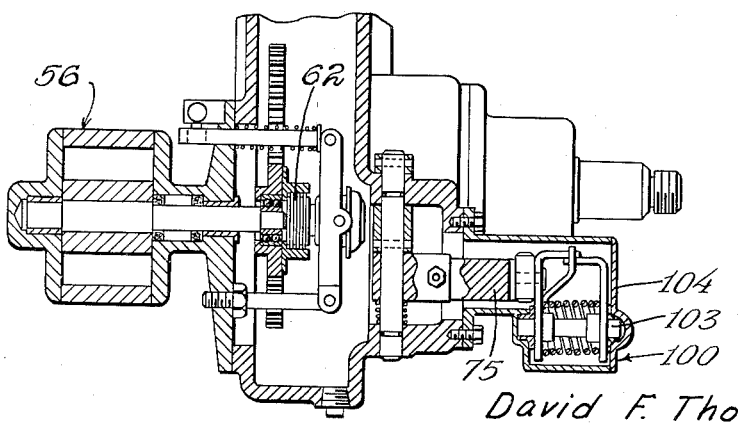
FIG. 2
FIG. 3
INVENTORS
David F. Thomas
Robert A. Hill
BY Robert M. Dunning
ATTORNEY

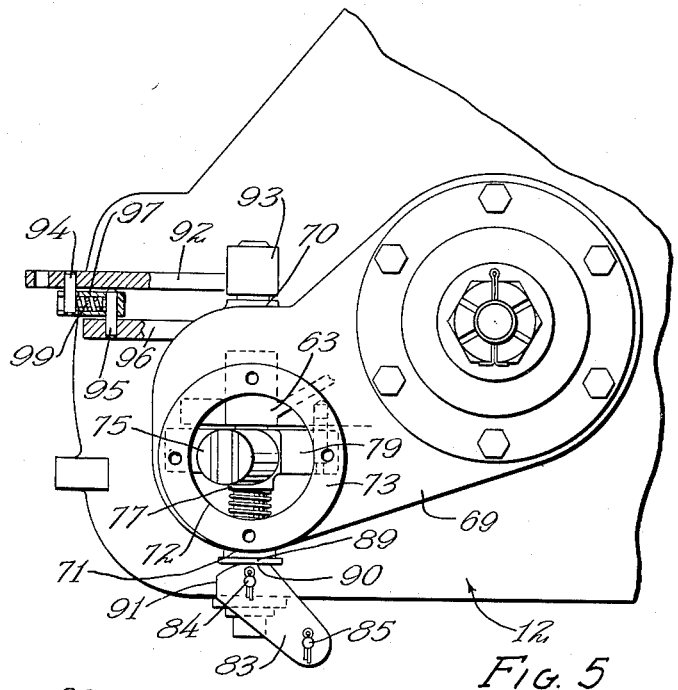
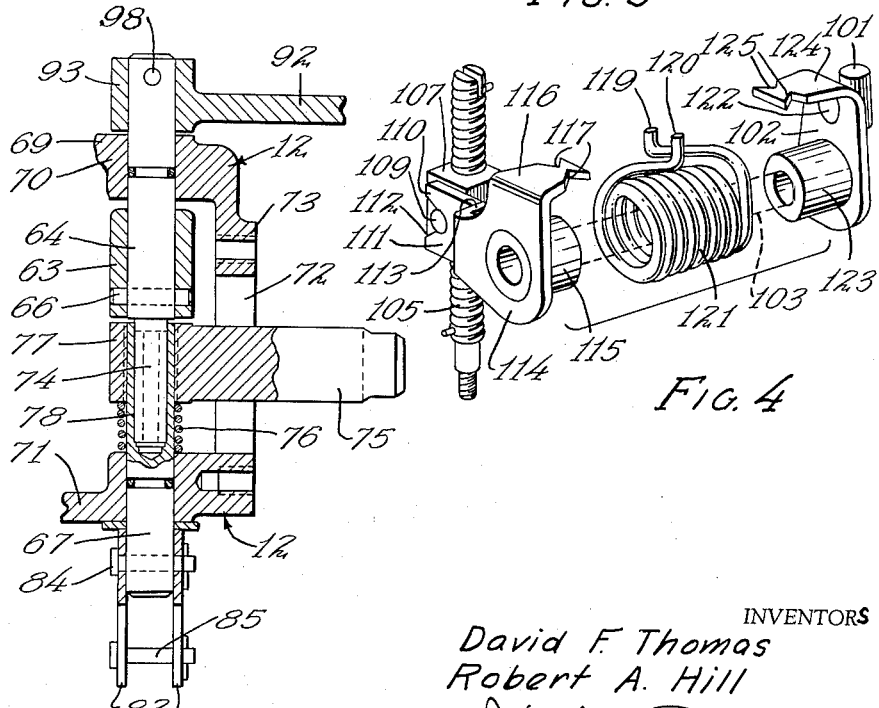

INVENTORS
David F. Thomas
Robert A. Hill
BY Robert M. Dunnie
ATTORNEY

United States Patent Office 2,988,189
Patented June 13, 1961

2,988,189
ELECTRO-MATIC SHIFT FOR FIRE PUMPS
David F. Thomas, St. Paul, and Robert A. Hill, Minneapolis, Minn., assignors to Waterous Company, St. Paul, Minn., a corporation of Minnesota
Filed Apr. 28, 1958, Ser. No. 731,387
10 Claims. (Cl. 192—99)

This invention relates to an improvement in electrically operated shift mechanisms for use in shifting the drive gears of a centrifugal pump and deals particularly with an apparatus for disengaging the drive shaft of a fire truck from the propeller shaft of the vehicle and connecting the drive shaft to the drive gears of the centrifugal pump to operate the same.

In the past, it has been common practice to provide a clutch on the drive shaft leading from the engine of a fire truck to selectively connect this drive shaft either with the propeller shaft of the vehicle or with the drive gears of the centrifugal pump. This clutch has usually been manually operated and must either include a series of links and levers leading to a point near the driver's seat of the vehicle or else must be operated manually from a point adjoining the clutch. Where the clutch is operated by remote control, there is always a possibility of mechanical failure. Where the clutch is operated manually from a point adjacent the clutch, it is necessary that an operator be located at this point in order to accomplish the necessary result. Thus, while the last system is somewhat more dependable, it usually requires an extra operator to accomplish the task.

An object of the present invention lies in the provision of an electrically operated shifting mechanism which is capable of shifting the clutch from one position to the other. This shift mechanism may be operated by a push button or other switch located conveniently to the operator so that the speed of operation of the vehicle motor and the shifting operation of the clutch may be readily synchronized by a single operator and the necessity of mechanical clutch operating means and the necessity of providing a separate operator for shifting the clutch may be eliminated.

A feature of the present invention resides in the provision of a remote control device which is electrically operated to shift the clutch from one position to the other. A pre-loaded double acting spring connects an electrically operated actuating lever to a coaxially pivotal shift lever. The actuating lever is pivoted by having one end pivotally and slidably engaging a cross head movable on a threaded shaft. Rotation of the shaft in one direction moves the cross head toward one end of the shaft, pivoting the actuating lever. This pivotal movement is transmitted through the spring to the coaxial shift lever, moving the shifting fork in one direction. Rotation of the shaft in the opposite direction moves the cross head toward the other end of the shaft, pivoting the actuating lever in the opposite direction. Motion is transmitted through the spring to the shift lever, which in turn moves the shifting fork in the opposite direction. In the event the gear teeth of the clutch are misaligned, the spring is wound to a greater tension due to the fact the shift fork is held from completing its movement. The first slight rotational movement of the drive shaft, as when engaging the clutch, brings the teeth into alignment and the spring snaps the clutch collar into full engagement automatically.

A feature of the present invention resides in the provision of an electrically operated shift mechanism which may be quickly and easily operated manually in the event of power failure or in the event of mechanical failure of the shifting unit. Means are provided to quickly and readily disengage the shifting unit from the shifting fork in the event of such an emergency. A manually operable lever is connected to the shifting fork and may be operated to manually shift the clutch.

This application is a continuation-in-part of our previously filed application Serial No. 562,959, filed February 2, 1956 for Centrifugal Fire Pump.

These and other objects and novel features of the present invention will be more clearly and fully set forth in the following specification and claims.

In the drawings forming a part of the specification:
FIGURE 1 is a vertical sectional view through a centrifugal pump and through the gear housing showing the general arrangement of parts therein.

FIGURE 2 is a horizontal sectional view taken on the line 2—2 of FIGURE 1 through the lower portion of the gear housing showing the general arrangement of the shifting mechanism.

FIGURE 3 is a sectional view through a portion of the gear housing and priming pump drive shaft illustrated in FIGURE 2, the position of the section being indicated by the lines 3—3 of FIGURE 2.

FIGURE 4 is a perspective view of a portion of the gear shifting unit detached from the remainder of the structure.

FIGURE 5 is an elevational view of a portion of the gear housing with the electrical actuating unit detached therefrom.

FIGURE 6 is a vertical sectional view through the vertical pivot shaft to which the shift fork and the clutch shifting fork are secured.

Figure 1:
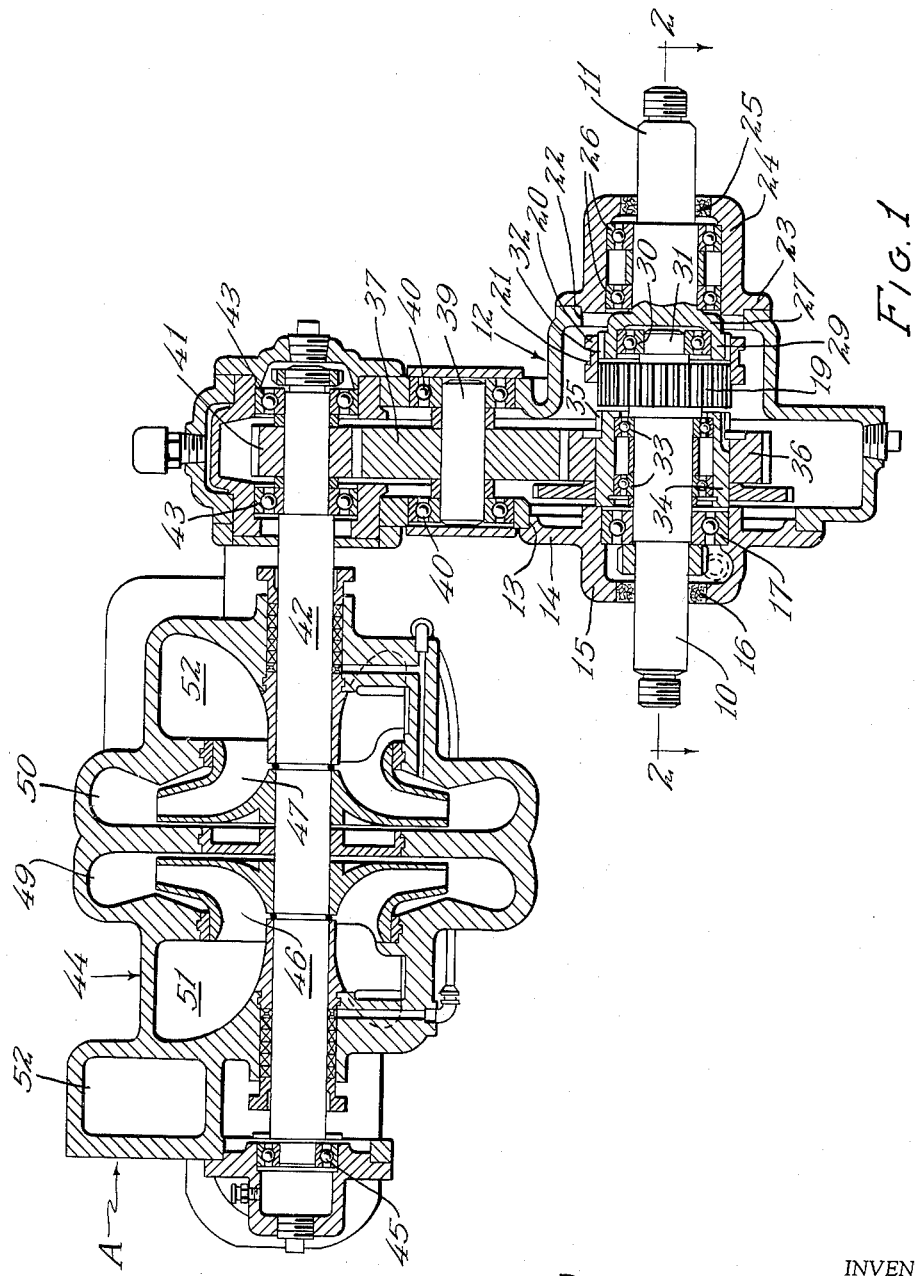

In general, the centrifugal pump A is of the type normally mounted on fire trucks and the like and is of the type described in the above mentioned application previously referred to. The pump A is driven by a drive shaft 10 connected by suitable means to the vehicle engine. A driven shaft 11 is aligned with the drive shaft 10 and may be connected thereto by the clutch which will be described. The driven shaft 11 is connected to the propeller shaft or in a suitable way to the vehicle differential to drive through this differential to the vehicle drive wheels.

The shafts 10 and 11 are rotatably supported in the gear housing which is indicated in general by the numeral 12. The housing 12 is provided on one side with an opening 13 normally closed by a cover plate 14 having a cup shaped projection 15 provided with an axial aperture 16 through which the shaft 10 extends. A bearing 17 extends between the cover plate 14 and the shaft 10 to support the shaft. The drive shaft 10 is provided near its inner extremity with an enlarged diameter portion 19 which is externally toothed or splined to slidably support a shifting collar 20. The collar 20 is externally grooved as indicated at 21 to accommodate the shifting fork which will be later described. The collar 20 is movable axially on the shaft 10.

The gear housing 12 is provided with a second aperture through the side of housing opposite that having the aperture 13. This second aperture 22 is in axial alignment with the aperture 13 and is normally closed by a closure plate 23 having a cup shaped projection 24 provided with an axial aperture 25 therein. Spaced bearings 26 are provided within the cup shaped projection 24 to support the shaft 11 in axial alignment with the shaft 10. The shaft 11 is provided with a flange 27 at its inner end which supports a hollow sleeve 29 projecting beyond the inner end of the saft 10. The sleeve 29 accommodates a bearing 30 which is interposed between the sleeve and the small diameter inner extremity 31 of the shaft 10 so as to hold the two shafts in alignment. The sleeve 29 is externally toothed or splined as indicated at 32 to accommodate the internal splines on the shift collar 20. When the shifting collar 20 is in the position shown in FIGURE 1 of the drawings and overlaps a part of the externally splined drive shaft portion 19 and the sleeve 29, the driven shaft 11 will rotate with the drive shaft 10 so that the vehicle engine may operate to drive the vehicle wheels.

The drive shaft 10 is encircled by a pair of bearings 33 which support a concentric sleeve 34 in shaft encircling position. The end of the sleeve adjoining the drive shaft enlargement 19 is externally splined as indicated at 35 and this sleeve is of the same external diameter as the shaft enlargement 19 so as to accommodate the internal splines of the shifting collar 20. Thus, when the collar is moved to the left from the position shown in FIGURE 1, this collar may simultaneously engage the splines of the shaft enlargement 19 and the splines 35 of the sleeve 34 to rotate this sleeve in unison with the drive shaft.

The sleeve 34 is keyed or otherwise secured to a drive gear 36 which meshes with an idler gear 37 mounted upon a counter shaft 39 supported by bearings 40 mounted in the gear housing 12. The idler gear 37 is in turn in mesh with a gear 41 mounted upon the pump impeller shaft 42. Bearings 43 mounted in the gear housing 12 support an end of the impeller shaft 42, the shaft extending laterally from the gear housing and into the pump housing 44.

The details of construction of the centrifugal pump are not of importance in the present application. The pump housing 44 is secured in fixed relation to the gear housing 12 and includes a bearing 45 supporting the end of the impeller shaft 42 opposite the end supported by the bearings 43. Impellers 46 and 47 are mounted upon the impeller shaft 42 to rotate therewith within the impeller chambers or volutes 49 and 50 respectively. Intake manifolds 51 and 52 are in communication with the inlet ends of the impellers 46 and 47 and the volutes 49 and 50 are connected to a discharge manifold in a suitable manner not shown.

With reference now to FIGURE 2 of the drawings, it will be noted that a second gear 53 is also mounted upon the sleeve 34 together with the gear 36. The gear 53 is in mesh with a cooperable gear 54 rotatably supported upon a drive shaft 55 leading to a priming pump 56. The priming pump 56 is provided with rotors 57 and 59 mounted upon the shaft 55 and a parallel shaft 60 respectively. The form of the priming pump 56 is not of importance in the present invention and this pump may be either driven by an electric motor 61 connected to the rotor shaft 60 or by the vehicle motor acting through the gears 53 and 54. A clutch 62 is provided for connecting the gear 54 for rotation with the shaft 55 when desired.

A shifting fork 63 is secured to a pivot shaft 64 supported by the gear housing 12 in a manner which will be later described and is provided with rollers or shoes 65 engageable in the groove 21 of the shifting collar 20 to move this collar in an axial direction. By operation of the shifting fork 63, the collar 20 may be moved into either extreme position to selectively drive the driven shaft 11 or the pump drive gear 36.

As indicated in FIGURE 6 of the drawings, the shifting fork 63 is secured to the shaft 64 by a pin 66 or other suitable means. A shaft 67 extends through a wall of the gear housing 12, the shafts 64 and 67 as well as the shifting fork 63 being positioned in a hollow outwardly projecting portion 69 of the gear housing 12 so that the upper end of the shaft 64 may project through an upper wall 70 of the hollow projection 69 and the lower end of the shaft 67 may extend through a portion of the lower wall 71 of the projection. The projecting housing portion 69 is provided with an aperture 72 extending therethrough with its axis substantially intersecting the axes of the shafts 64 and 67. A flange 73 encircles the aperture 72 and provides a means of attachment with the electrical shifting unit which will be later described.

The upper end of the shaft 67 is provided with an axial socket 78 designed to accommodate the reduced diameter lower end 74 of the shaft 64. An adaptor or actuator 75 is threaded or otherwise secured to the upper end of the shaft 67 and projects through the aperture 72. A spring 76 is interposed between the upper surface of the lower wall 71 of the housing projection 69 and the undersurface of the actuator hub 77 to urge the upper end of the shaft 67 toward the undersurface of the hub of the shifting fork 63.

Figure 7:
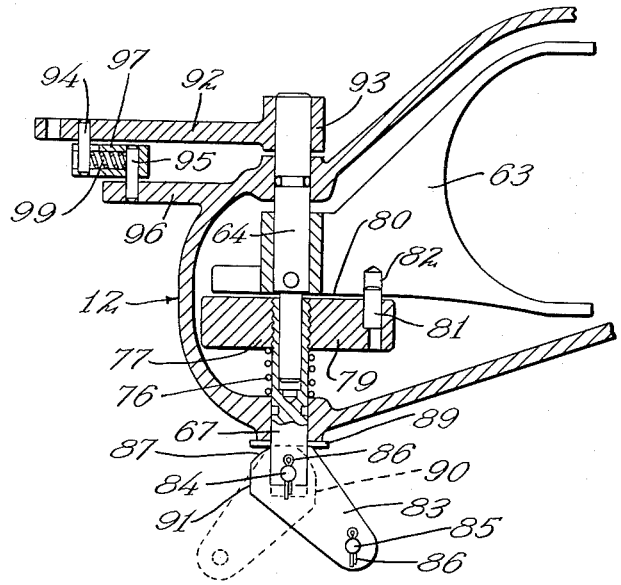
FIGURE 7 is a sectional view showing the detachable connection between the clutch shift fork and the shifting actuator.
Figure 8:
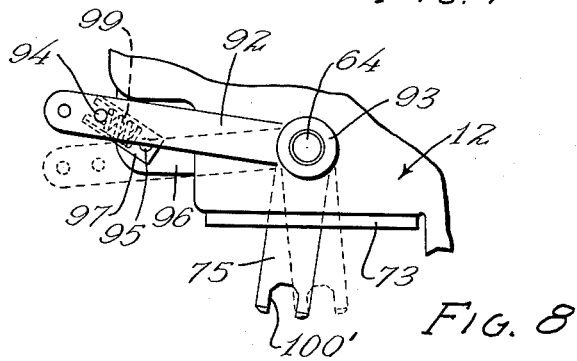
FIGURE 8 is a plan view of a portion of the pump showing the manual clutch shifting lever.

As shown in FIGURES 5 and 7 of the drawings, the hub 77 of the actuator is provided with a radially projecting arm 79 which extends normally parallel to the shifting fork 63 and underlies the lower surface 80 of the shifting fork. The arm 79 is provided with an upwardly projecting pin 81 which is engageable in a socket 82 in the undersurface 80 of the shifting fork 63. As a result, in the normal position of the actuator or adaptor 75, the adaptor will pivot in unison with the shifting fork. However, a means is provided for disengaging the adaptor from the shifting fork as will perhaps be best shown from an examination of FIGURE 5 of the drawings.

A pair of cam plates 83 are pivotally connected to the lower end of the shaft 67 by means of a pivot pin 84 extending diametrically through the shaft 67. The cam plates 83 are held in parallel relation by a second pin 85 extending through the free ends of these plates. The pins 84 and 85 are preferably provided with enlarged heads on one end and are held in place by cotter keys 86 or other suitable means. The cam plates are provided with upper cam surfaces 87, two portions of which are flattened to provide dwells. The cam surfaces 87 bear against a bearing washer 89 encircling the shaft 67. One flattened cam surface area 90 normally engages against the bearing washer when the actuator 75 is in its normal elevated position. The other flattened surface 91 is engageable against the bearing washer 89 when the cam plates are swung in a clockwise direction as viewed in FIGURE 5. Due to the difference in distance between the axis of the pivot 84 and the flattened surfaces 90 and 91, rotation of the cam plate 83 in a clockwise direction draws the shaft 67 downwardly, compressing the spring 76. Downward movement of the shaft 67 is sufficient to withdraw the pin 81 from its socket 82 in the shifting fork thereby permitting independent movement of the shifting fork with respect to the actuator 75.

A manually operable lever 92 is provided with a hub 93 pinned or otherwise connected as indicated at 98 to the upper end of the shaft 64. Thus, by pivoting the lever 92 manually, the shifting fork 63 may be moved from one extreme position to the other.

A pin 94 extends downwardly from the lever 92 and a second pin 95 extends upwardly from an arm or rib 96 forming an external part of the gear housing 12. The pins 94 and 95 extend through a longitudinally slotted sleeve 97 and a compression spring 99 is located in the sleeve 97 between the pins 94 and 95. The spring 99 tends to hold the lever 92 in either extreme position.

The electrical actuator 100 which comprises the shifting unit is not shown in great detail. In general, the shifting unit 100 acts to pivot the actuator arm 75 about the axis of the shaft 64 and of the shaft 67 on which it is mounted. The end of the actuator arm 75 is notched as is indicated at 100' to accommodate a shoe 101 pivotally supported upon a lever 102 which in turn is pivotally supported upon a shaft 103 mounted in the actuator housing 104, the shaft 103 being generally parallel to the axis of the actuator arm 75 in intermediate position thereof.

The manner in which the electrical actuator functions may perhaps be best understood from an examination of FIGURE 4 of the drawings. This figure shows diagrammatically a threaded screw 105 which is attached to a motor 106 not illustrated in this figure. The screw 105 may be rotated in either direction by the motor. A block 107 is internally threaded to engage the screw 105 and includes a pair of oppositely directed pins or rollers 109. A U-shaped yoke 110 is provided with parallel ends, one of which is shown at 111 in FIGURE 4 and these ends are notched as indicated at 112 to accommodate the pins 109, one pin engaging in each notch. The notch 110 is mounted on an arm 113 forming a part of the lever 114. The lever 114 is pivotally supported upon the shaft 103 shown only in dotted outline in FIGURE 4 in view of the fact that FIGURE 4 shows the parts in exploded form.

The lever 114 is provided with a hub 115 designed to fit about the shaft 103 and is provided with an arm 116 which is bent into substantially parallel relation to the shaft 103. The lever 116 is notched as indicated at 117 to accommodate the ends 119 and 120 of the torsion spring 121.

The lever 102 upon which the member 101 is pivotally supported by a pivot 122 also includes a hub 123 designed to accommodate the shaft 103 and includes an arm 124 which is designed to overlap the arm 116 and which is notched as indicated at 125 to accommodate the ends 119 and 120 of the spring 121.

As the threaded member 105 rotates in one direction, the block 107 is moved upwardly thereupon and the pins 109 engage the arms 110 of the yoke and pivot the lever 114 in a clockwise direction as viewed in FIGURE 4. As considerable force is required to move the clutch collar 20, the spring 121 is pre-tensioned so that the pivotal movement of the lever 114 is transmitted through this spring to the lever 102, to move it in a clockwise direction. In the event the teeth of the clutch sleeve 20 do not align with the cooperable teeth 35, this misalignment will prevent complete movement of the shifting fork 63, and of the lever 102. The actuating lever will continue to rotate until the cross head block 107 reaches its extreme position, further winding the spring 121. Upon slight rotation of the drive shaft 10, the teeth will become aligned, and the spring will snap the sleeve 20 into fully engaged position.

A similar action takes place when the threaded member 105 is operated in the opposite direction. Pivotal movement of the lever 114 will be transmitted through the spring 121 to the lever 102, which acts through the shifting fork 63 to move the collar 20 to its opposite extreme position. If prevented from completing movement by misalignment of the teeth of clutch collar with the gear teeth 32, the spring will wind further until the teeth are aligned, and will then complete movement of the clutch sleeve automatically.

Figure 9:
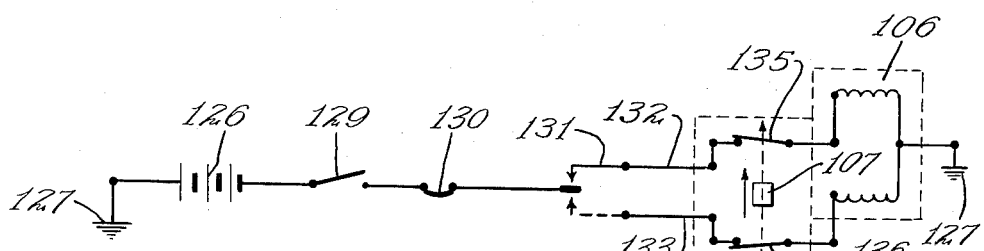
FIGURE 9 is a wiring diagram of the apparatus.

FIGURE 9 of the drawings indicates the wiring diagram of the apparatus. One terminal of the battery 126 is grounded as indicated at 127. The other terminal extends through an ignition switch 129 and a circuit breaker 130 to a single pole double throw switch 131.

The conductors 132 and 133 leading from the switch terminals of switch 131 are connected to limit switches 135 and 136, which are normally closed unless opened by movement of the actuator block 107 into either extreme position. The switch 135 closes the circuit through conductor 132 and switch 136 closes the circuit through conductor 133. Switch 135 is connected to one field coil of actuator motor 106 for operation in a direction to move block 107 toward switch 135, while switch 136 is connected to another field coil of the motor for operation in the opposite direction. The two fields are connected at their other terminals to a common ground 127.

With the switch 131 engaging the conductor 132, the motor 106 will move the block 107 until it opens the limit switch 135, breaking the circuit through conductor 132. The switch 136 is in position closing the circuit through conductor 133. However, no current will flow through conductor 133 because of the poistion of the control switch 131. When the switch 131 is moved into contact with conductor 133, the motor 106 will rotate in a reverse direction moving the block 107 toward its other extreme position and allowing switch 135 to close. The block 107 then engages the limit switch 136, opening the circuit through conductor 133.

In accordance with the patent statutes, we have described the principles of construction and operation of our electro-matic shift for fire pumps, and while we have endeavored to set forth the best embodiment thereof, we desire to have it understood that changes may be made within the scope of the following claims without departing from the spirit of our invention.

We claim:

1. An electrically operable shift for actuating a shifting clutch between two extreme positions, the shift including a shift collar, a shift fork for moving said collar, means pivotally supporting said shift fork, an actuator arm, said actuator arm being pivotally supported coaxial to said shift fork, cooperable means on said shift fork and on said actuator arm for interconnecting said shift fork and said actuator arm for pivotal movement in unison, said actuator arm being axially movable relative to said shift fork, said cooperable means disengaging said shift fork from said actuator arm upon relative axial movement of said actuator arm, and electrically operable means engaging said actuator arm to pivot the same.

2. The structure of claim 1 and including a manually operable handle lever connected to said shift fork for actuating said shift fork manually when said cooperable means is disengaged.

3. The structure of claim 1 and including resilient means urging said cooperable means into interconnecting position.

4. The structure of claim 1 and including resilient means normally urging said cooperable means into interconnecting position, and including manually operable means connected to said actuator arm for moving the same out of interconnecting position.

5. A device for shifting a clutch between two extreme positions including a clutch shifting fork, shaft means pivotally supporting said shifting fork, an actuator arm mounted coaxial with said shaft means and axially slidable relative thereto, cooperable means on said actuator arm and on said shifting fork interconnecting the same for pivotal movement in unison in one slidable position of said actuator arm, said cooperable means being disengaged to permit independent pivotal movement of said shifting fork relative to said actuator arm in another position of said actuator arm, and power driven means connected to said actuator arm to pivot the same in either direction.

6. The structure of claim 5 and including a second shaft means pivotally and slidably supporting said actuator arm, and manually operable means engaging said second shaft means for sliding said second shaft means and said actuator arm into and out of interconnecting position.

7. The structure of claim 6 and in which said manually operable means comprises a cam means.

8. The structure of claim 6 and including means resiliently urging said cooperable means into interengaging position.

9. The structure of claim 5 and including means resiliently urging said cooperable means into interengaging position.

10. The structure of claim 5 and in which said cooperable means between said actuator arm and said shift fork comprises a pin connected to said actuator arm engageable into a socket in said shift work, said pin being parallel the axis of said shaft means.

References Cited in the file of this patent

UNITED STATES PATENTS 132,234    Bates _____ Oct. 15, 1872

(Other references on following page)

UNITED STATES PATENTS

| | | |
|---|---|---|
| 655,415 | Pessano | Aug. 7, 1900 |
| 2,195,908 | Wagner | Apr. 2, 1940 |
| 2,195,909 | Wagner | Apr. 2, 1940 |
| 2,373,259 | Price | Apr. 10, 1945 |
| 2,398,407 | Brownyer | Apr. 16, 1946 |
| 2,649,813 | Barth et al. | Aug. 25, 1953 |
| 2,667,251 | Banker | Jan. 26, 1954 |

FOREIGN PATENTS

| | | |
|---|---|---|
| 130,067 | Germany | Apr. 28, 1902 |
| 166,028 | Australia | Nov. 16, 1955 |